United States Patent [19]

Hamano

[11] Patent Number: 5,009,492

[45] Date of Patent: Apr. 23, 1991

[54] ZOOM LENS

[75] Inventor: Hiroyuki Hamano, Kanagawa, Japan

[73] Assignee: Canon Kabushiki Kaisha, Tokyo, Japan

[21] Appl. No.: 387,826

[22] Filed: Aug. 1, 1989

[30] Foreign Application Priority Data

Aug. 10, 1988 [JP] Japan .................. 63-199581
Aug. 10, 1988 [JP] Japan .................. 63-199582

[51] Int. Cl.⁵ .......................... G02B 15/14
[52] U.S. Cl. ................................. 350/427
[58] Field of Search .............. 350/427, 500, 423

[56] References Cited

U.S. PATENT DOCUMENTS

| | | | |
|---|---|---|---|
| 4,802,747 | 2/1989 | Horiuchi | 350/427 |
| 4,818,083 | 4/1989 | Mihara | 350/427 |
| 4,844,602 | 7/1989 | Kitagishi et al. | 350/500 |

*Primary Examiner*—Bruce Y. Arnold
*Assistant Examiner*—Rebecca D. Gass

*Attorney, Agent, or Firm*—Fitzpatrick, Cella Harper & Scinto

[57] ABSTRACT

A zoom lens comprising: a first, when counted from an object side hereinafter, lens group having a positive refractive power; a second lens group having a positive refractive power; a third lens group having a positive refractive power; and a fourth lens group having a positive refractive power, whereby variation of magnification is performed by moving the second lens group and the fourth lens group, and focusing is performed by moving the fourth lens group, the lens group satisfying the following conditional expressions provided that a focal length of the fourth lens group is f4, a focal length of the entire lens system at a wide-angle end is $f\omega$, a zoom ratio is z, and an imaging magnification at a telephoto end of the second lens group is $\beta 2T$:

$$0.9 < |\beta 2T/\sqrt{z}| < 1.4$$

$$1.8 < f4/f\omega < 2.4$$

9 Claims, 5 Drawing Sheets

ZOOM LENS

BACKGROUND OF THE INVENTION

1. Field of the Invention

This invention relates to a zoom lens, and, more particularly to a zoom lens exhibiting high variable power, excellent optical performance, and a reduced size.

2. Description of the Related Art

Hitherto, a variety of zoom lenses of so-called a rear focusing type for a photographing camera or a video camera have been disclosed, the rear focusing type structure being characterized in that lens groups except for a first lens group adjacent to the object are moved for the purpose of performing the focusing.

In general, since the rear focusing type zoom lens conducts its focusing by moving lens groups of a relatively reduced size and lightened weight, it exhibits advantages in that the force required to move the lens groups can be reduced and a quick focusing can be conducted.

For example, a so-called a four-group zoom lens of the rear focusing type comprises four lens groups and is structured in such a manner that the third lens group of the four lens groups is moved for the purpose of conducting the focusing, the four lens group consisting of, counted from the object side, a first lens group having a positive refractive power, a second lens group having a negative refractive power which is capable of varying the magnification, a third lens group having a negative refractive power which is capable of correcting the image change due to the magnification variance, and a fourth lens group having a positive refractive power.

Another zoom lens of the rear focusing type has been disclosed in Japanese Laid-Open Patent Application No. Sho 58-136012, this zoom lens being structured in such a manner that the magnification varying portion thereof comprises three or more lens groups, and a portion of these groups is arranged to be moved for the purpose of conducting the focusing.

However, the above-described type zoom lenses encounter the following problem:

the distance of the extension distance of the focusing lens group with respect to the same object distance becomes variable due to the difference in the zoom position, that is, the difference in the focal distance, and this extension distance is varied in the form of a quadratic curve or is varied discontinuously;

if the magnification varying ratio is raised, the wide-angle end needs to be given a larger space in which the focusing lens group moves, causing the size of the lens system to be enlarged;

in the rear focusing type zoom lens, the extension distance of the focusing lens group with respect to the same object distance becomes considerably longer at the telephoto end than that at the wide-angle end;

the distance of movement of the image plane with respect to the distance of movement of the focusing lens group, that is, the sensitivity becomes larger at the telephoto end, and a certain amount of increase in the sensitivity causes a difficulty in performing the mechanical control of movement of the focusing lens group;

if the sensitivity at the telephoto end is, on the contrary, arranged to a degree which is capable of being controlled, the sensitivity at the wide-angle end becomes reduced excessively, causing a necessity of providing a large space in which the focusing lens group moves, and the size of the lens group becomes large.

There have been related arts disclosed in U.S. patent application Ser. No. 026,004 filed on Mar. 16, 1987. Furthermore, related arts disclosed in U.S. Pat. No. 3,501,224, and that disclosed in U.S. Pat. No. 4,256,381 are known.

SUMMARY OF THE INVENTION

An object of the present invention is to provide a zoom lens employing a rear focusing structure.

Another object of the present invention is to provide a zoom lens having a lens system whose size can be reduced and capable of realizing a high aperture ratio and high variable power.

A further object of the present invention is to provide a zoom lens exhibiting an excellent optical performance through its overall variable power range starting from the wide-angle end to the telephoto end.

A still further object of the present invention is to improve the above-described zoom lens disclosed in U.S. patent application Ser. No. 026,004.

Further objects of the present invention will be apparent from the following drawings and description.

BRIEF DESCRIPTION OF THE DRAWINGS

FIGS. 3(A), 4(A), and 5(A) are views which illustrate the aberrations at the wide-angle end, FIGS. 3(B), 4(B), and 5(B) are views which illustrate the aberrations of the zooming position at the intermediate position, and FIGS. 3(C), 4(C), and 5(C) are views which illustrate the aberrations of the zooming position at the telephoto end.

DETAILED DESCRIPTION OF THE PREFERRED EMBODIMENTS

Figure 1:
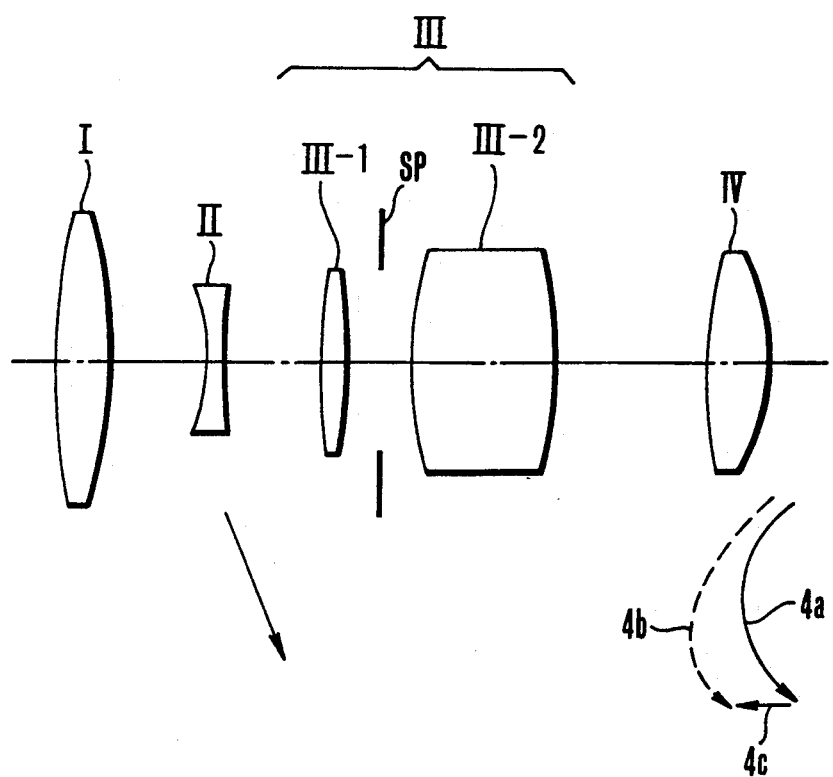
FIG. 1 is a view which illustrates the basic arrangement of lenses of a zoom lens according to the present invention.
Figure 2:
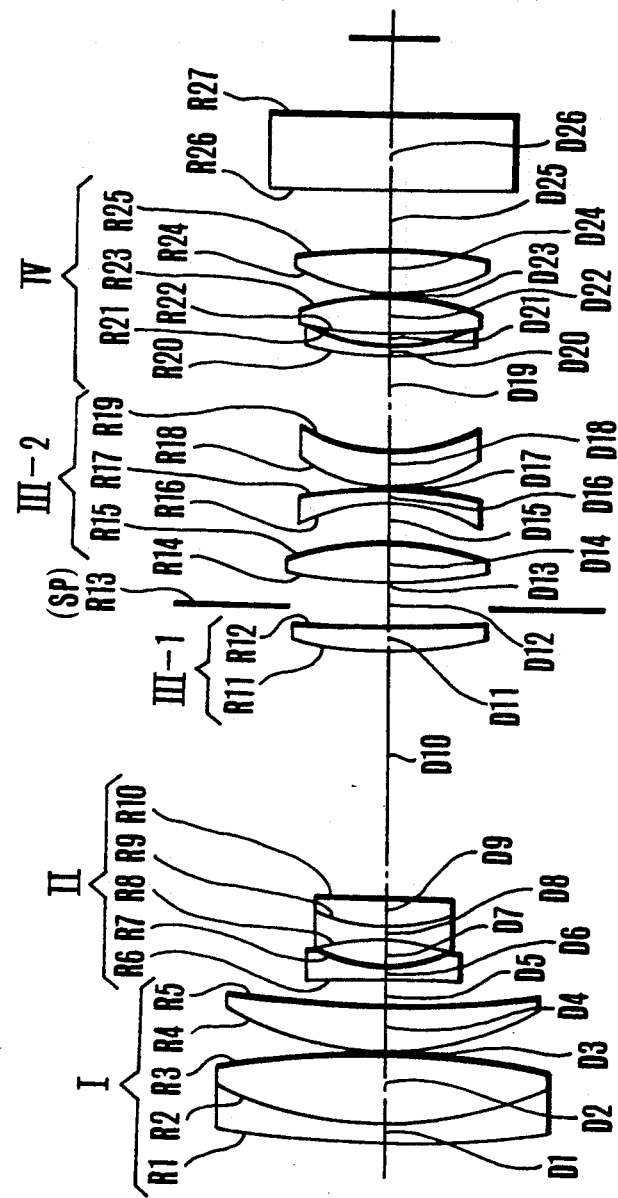
FIG. 2 is a cross-sectional view which illustrates numerical examples 1 to 3 of the zoom lens according to the present invention.
Figure 3A:
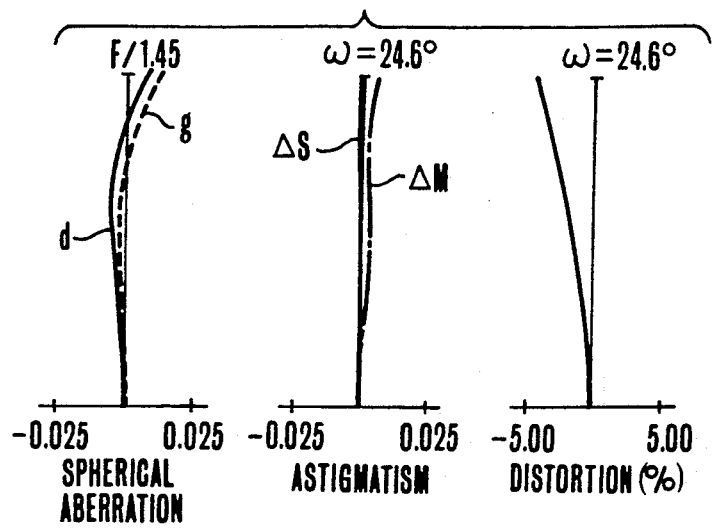
FIGS. 3(A), 3(B), 3(C), 4(A), 4(B), 4(C), 5(A), 5(B), and 5(C) are views which illustrate aberrations corresponding to the numerical examples 1 to 3, where
Figure 3B:
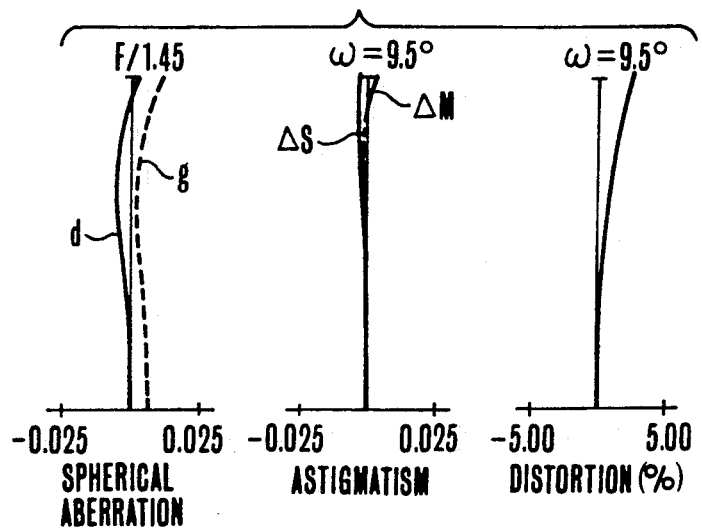
Figure 3C:
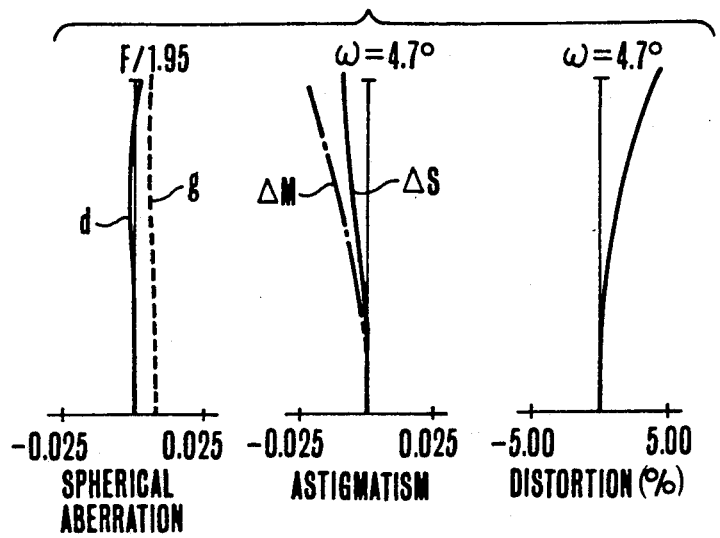
Figure 4A:
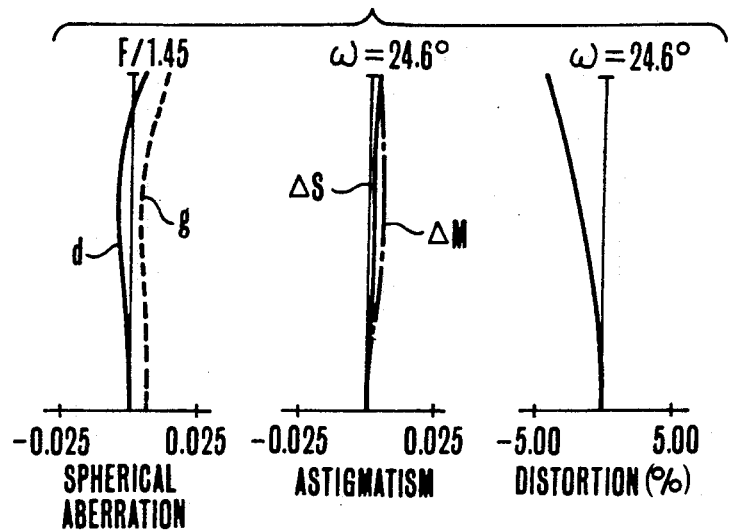
Figure 4B:
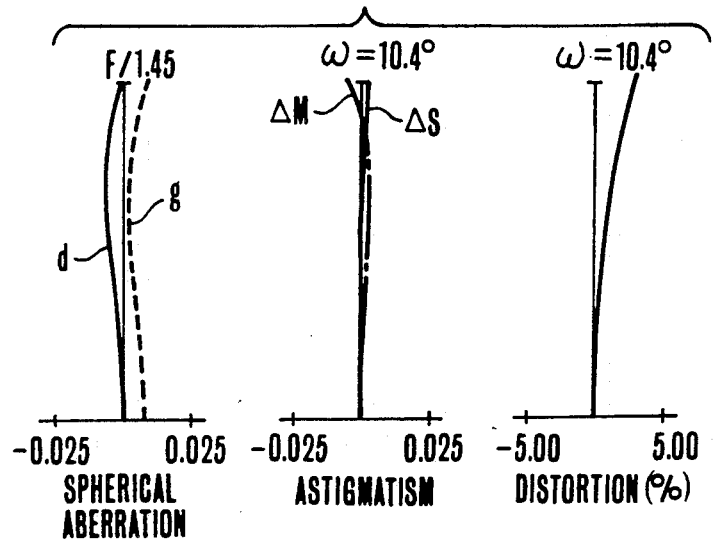
Figure 4C:
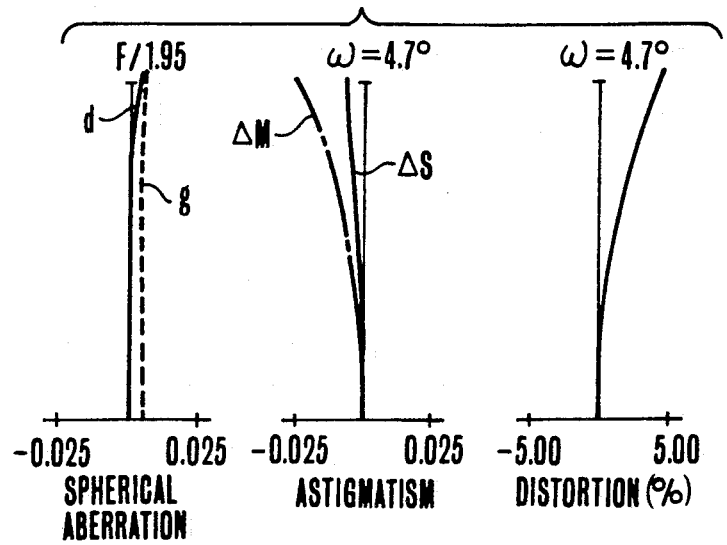
Figure 5A:
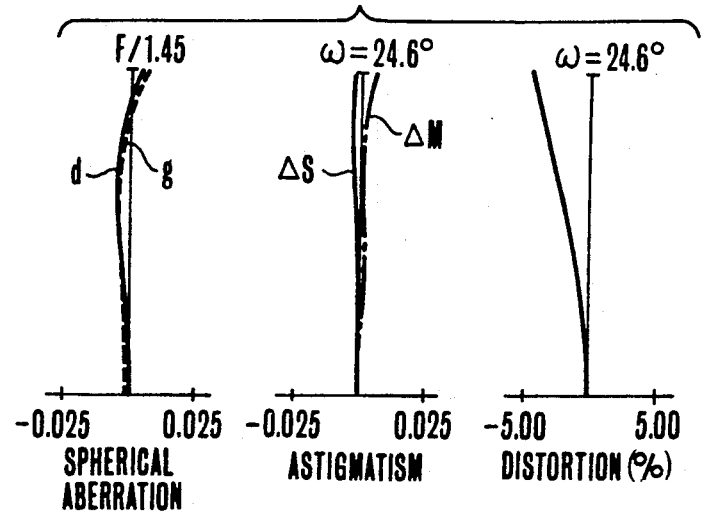
Figure 5B:
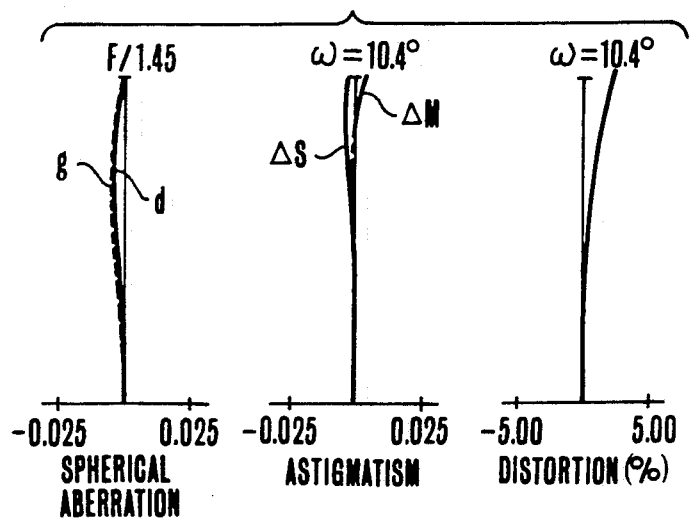
Figure 5C:
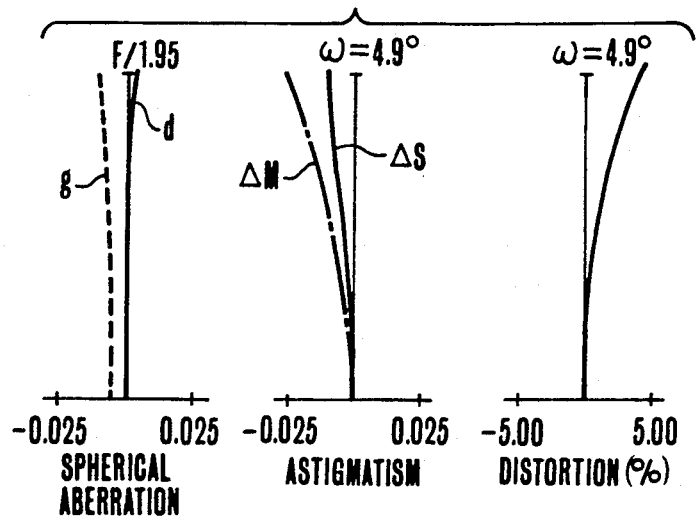

FIG. 1 is a schematic view which illustrates an embodiment of a zoom lens of a rear focusing type according to the present invention, and in which the paraxial refractive power distribution is illustrated.

Referring to the drawing, the zoom lens of this type comprises:

a first lens group I having a positive refractive power;

a second lens group II having a negative refractive power;

a third lens group III having a positive refractive power; and a fourth lens group IV having a positive refractive power.

The third lens group III comprises:

a front lens unit III-I having a positive refractive power;

an aperture stop SP; and a rear lens unit III-2 having a positive or a negative refractive power.

When the variation of magnification is performed from the wide-angle end to the telephoto end, the second group II is moved to the image plane side and the image plane change due to the variation of magnification is corrected by moving the fourth group IV.

The zoom lens according to the present invention employs a rear focusing type structure characterized in that the fourth group IV is moved along the optical axis. A continuous line curve 4a and a dashed-line curve 4b of the fourth lens group IV show the locus of the movement of the same performed for the purpose of correcting the image plane change when the variation of magnification conducted from the wide-angle end to the telephoto end when an infinite object and a near object are focused, respectively.

The first lens group I and the third lens group III are stationary when the variation of magnification and the focusing are performed.

According to this embodiment, the correction of the image plane change due to the variation of magnification is corrected by moving the fourth lens group IV, and the focusing is performed by moving the fourth lens group IV. In particular, when the variation of magnification from the wide-angle end to the telephoto end is performed, the fourth lens group IV is, as shown by the curves 4a and 4b in FIG. 1, moved so as to form a locus projecting to the object side. As a result, the space between the third lens group III and the fourth lens group IV are effectively used, and the overall length of the lens system can be effectively shortened.

According to this embodiment, when a focusing from an infinite object to a near object is performed at the telephoto end, the fourth lens group IV is moved forward as shown by a straight line 4c shown in FIG. 1.

According to this embodiment, the inevitable increase in the effective aperture of the lens of the first lens group I can be further effectively prevented by employing the above-described rear focusing type structure with respect to the conventional four-group zoom lens in which the first lens group is moved forward.

In addition, the aberration change due to the movable lens group can be reduced by disposing the aperture stop between the front lens unit and the rear lens unit of the third lens group III and the diameter of the front lens can be easily reduced by shortening the interval between the front lens groups.

According to the present invention, the following conditional expressions hold provided that the focal length of the second, third, fourth lens groups and the front lens unit are F2, F3, F4, F3-1, respectively, and the focal length of the entire lens system at the wide-angle end is $f\omega$, the zoom ratio is z, the imaging magnification at the telephoto end of the second lens group is $\beta 2T$:

$$0.9 < |f2/f\omega| < 1.3 \quad (1)$$

$$0.9 < |\beta 2T/\sqrt{z}| < 1.4 \quad (2)$$

$$1.8 < f4/f\omega < 2.4 \quad (3)$$

$$2.8 < f3/f\omega < 3.7 \quad (4)$$

$$1.6 < \beta - 1/\beta < 2.6 \quad (5)$$

The conditional expression (1) relates to the refractive power of the second lens group II, and from which a predetermined variable power can be effectively obtained by reducing the aberration change due to the variation of magnification. If the refractive power of the second lens group is strengthened to exceed the lower limit, the size of the entire lens system can be reduced easily. However, the Petzval's sum increases in the negative direction, causing the curvature of field to be enlarged. Simultaneously, the aberration change due to the variation of magnification can be inevitably enlarged. On the other hand, if the refractive power of the second lens group is reduced excessively, the aberration change due to the variation of magnification can be reduced. However, the movement of the second lens group needed to obtain a predetermined variable power becomes enlarged, causing the overall length of the lens to become too lengthened.

The conditional expression (2) relates to the imaging magnification at the telephoto end of the second lens group with respect to the zoom ratio. If the imaging magnification becomes an excessively reduced value which exceeds the lower limit, the movement of the second lens group needed to obtain a predetermined variable power becomes too large, causing the overall length of the lens to be lengthened. On the contrary, the imaging magnification becomes an excessively large value which exceeds the upper limit, the overall length of the lens can be shortened. However, the locus of movement of the fourth lens group at the telephoto end corresponding to an infinite object can be rapidly changed, causing the drive means such as a motor to suffer from an excessive load.

The conditional expression (3) relates to the positive refractive power of the fourth lens group and capable of satisfactorily correcting the aberration change caused when the variation of magnification and the focusing are performed. If the positive refractive power of the fourth lens group becomes too strong, the spherical aberration cannot be sufficiently corrected, and as well the change in the aberration, specifically, change in the magnification chromatic aberration becomes excessive. It is difficult to satisfactorily correct the thus-enlarged change in the magnification chromatic aberration. If the positive refractive power of the fourth group becomes an excessively weak value which exceeds the upper limit, the movement of the fourth lens group becomes too large when the variation of magnification and the focusing are conducted, causing the overall length of the lens to be lengthened excessively.

The conditional expression (4) relates to the positive refractive power of the third lens group. If the positive refractive power of the third lens group becomes an excessively large value which exceeds the lower limit, the spherical aberration of the zooming position at the wide-angle end tends to become insufficient. Therefore, in order to obtain a predetermined back focal distance, the positive refractive power of the fourth lens group needs to be weakened by a degree which corresponds to the degree of necessary increase in the positive refractive power of the third lens group. As a result, the length of movement of the fourth lens group required for performing the focusing needs to be lengthened. If the positive refractive power of the third lens group becomes an excessively reduced value which exceeds the upper limit, the spherical aberration at the wide-angle end can be excessively corrected.

The conditional expression (5) relates to the positive refractive power of the front lens unit disposed forward than the aperture stop in the third lens group. If the refractive power of the front lens unit becomes an excessively large value which exceeds the lower limit, the change in the comatic aberration becomes too large in the range from the wide-angle end to the zooming position disposed an intermediate position. The thus-enlarged change cannot be satisfactorily corrected.

If the positive refractive power becomes an excessively small value which exceeds the upper limit, the effective diameter of the lens groups behind the aperture stop and the rear lens unit becomes too large.

On the other hand, the present invention comprises a structure, in terms of forming a desired shape of the lens, the third lens group including:

a first lens having a positive refractive power;

an aperture stop;

a second lens whose both sides are designed to be convex;

a third lens having a negative refractive power of a meniscus type whose convex side confronts the image plane; and a fourth lens having a positive refractive power;

The fourth lens group includes:

a first lens having a negative refractive power of a meniscus type whose convex side confronts the object;

a second lens whose both sides are formed in a convex shape; and a third lens whose both sides are formed in a convex shape.

According to the present invention, it is preferable that the following conditional expressions hold provided that, the focal length of the i-th lens group is fi, the curvature radius of the j-th lens surface in the i-th lens group is Ri, j, the Abbe numbers of the materials for the positive lens and the negative lens in the fourth lens group are $\nu P$ and $\nu N$, respectively:

$$1.2 < |R2,1/f2| < 27 \ldots \quad (6)$$

$$0.4 < |R3,5/f3| < 0.52 \ldots \quad (7)$$

$$0.71 < |R4,2/f4| < 0.93 \ldots \quad (8)$$

$$32 < \nu P - \nu N, \ldots \quad (9)$$

Then, the above-described conditional expressions will be further described in terms of the technical meanings. The conditional expression (6) relates to the curvature radius of the lens surface in the second lens group and disposed in the nearest position to the object, and capable of satisfactorily correcting change in the distortion due to variation of magnification. If the value exceeds the lower limit expressed in the conditional expression (6), the change in the distortion due to the variation of magnification becomes too large. On the contrary, the same exceeds the upper limit, the change in the coma aberration can be increased from the intermediate portion in the frame to the periphery.

The conditional expression (9) relates to the curvature radius of the lens surface having negative refractive power adjacent to the object. If the negative refractive power becomes an excessively large value which exceeds the lower limit, the spherical aberration can be excessively corrected through the entire magnification varying range. If the negative refractive power becomes an excessively reduced value which exceeds the upper limit, the spherical aberration cannot be sufficiently corrected to the entire magnification varying range, and simultaneously, the coma aberration can be increased through a magnification varying range from the wide-angle end to the intermediate portion. It is difficult to satisfactorily correct the thus-increased coma aberration.

The conditional expression (8) relates to the curvature radius of the lens surface of the first lens of a negative meniscus type. If the negative refractive power becomes an excessively enlarged value which exceeds the lower limit, the positive astigmatism increases. On the contrary, negative refractive power becomes an excessively reduced value which exceeds the upper limit, the negative astigmatism increases. It is difficult to correct the thus-increased astigmatism.

The conditional expression (9) serves to satisfactorily correct the magnification chromatic aberration through the entire variable range by properly determining the Abbe number of the material for the positive lens and that of the negative lens in the fourth lens group. If the value does not meet the conditional expression, the change in the magnification chromatic aberration becomes too large.

Then, numerical examples 1 to 3 according to the present invention will be described. Referring to the numerical examples, Ri represents the curvature radius of the i-th lens surface counted from the object side, Di represents the i-th lens thickness or air separation counted from the object side, Ni and $\nu i$ represent the refractive index of the i-th lens counted from the object side and the Abbe number of the same.

Table 1 shows the relationship between numerical examples and the conditional expression. The expressions R26 and R27 represent a glass material such as a face plate.

| Numerical Example 1 |||||
|---|---|---|---|
| $f = 1.0-5.573$ FNo = 1:1.45-1.95 $2\omega = 49.13°-9.318°$ ||||
| R1 = 10.129 | D1 = 0.1506 | N1 = 1.80518 | $\nu 1$ = 25.4 |
| R2 = 3.504 | D2 = 0.6131 | N2 = 1.51633 | $\nu 2$ = 64.1 |
| R3 = −7.711 | D3 = 0.0161 | | |
| R4 = 2.766 | D4 = 0.3980 | N3 = 1.65844 | $\nu 3$ = 50.9 |
| R5 = 10.898 | D5 = variable | | |
| R6 = −15.961 | D6 = 0.0860 | N4 = 1.83400 | $\nu 4$ = 37.2 |
| R7 = 1.124 | D7 = 0.3046 | | |
| R8 = −1.538 | D8 = 0.0860 | N5 = 1.51633 | $\nu 5$ = 64.1 |
| R9 = 1.538 | D9 = 0.2796 | N6 = 1.84666 | $\nu 6$ = 23.9 |
| R10 = −836.362 | D10 = variable | | |
| R11 = 3.614 | D11 = 0.2366 | N7 = 1.70154 | $\nu 7$ = 41.2 |
| R12 = 22.021 | D12 = 0.1613 | | |
| R13 = Stop | D13 = 0.2151 | | |
| R14 = 4.298 | D14 = 0.4302 | N8 = 1.57099 | $\nu 8$ = 50.8 |
| R15 = −2.172 | D15 = 0.3372 | | |
| R16 = −1.437 | D16 = 0.1076 | N9 = 1.80518 | $\nu 9$ = 25.4 |
| R17 = −4.832 | D17 = 0.0161 | | |
| R18 = 1.443 | D18 = 0.3227 | N10 = 1.60311 | $\nu 10$ = 60.7 |
| R19 = 1.724 | D19 = variable | | |
| R20 = 3.443 | D20 = 0.0860 | N11 = 1.84666 | $\nu 11$ = 23.9 |
| R21 = 1.713 | D21 = 0.1233 | | |
| R22 = 4.183 | D22 = 0.3442 | N12 = 1.48749 | $\nu 12$ = 70.2 |
| R23 = −2.391 | D23 = 0.0161 | | |
| R24 = 1.923 | D24 = 0.3872 | N13 = 1.60311 | $\nu 13$ = 60.7 |
| R25 = −9.909 | D25 = 0.5378 | | |
| R26 = ∞ | D26 = 0.6453 | N14 = 1.51633 | $\nu 14$ = 64.1 |
| R27 = ∞ | | | |
| | F = 1.0 | F = 2.509 | F = 5.573 |
| D5 | 0.1687 | 1.4594 | 2.1961 |
| D10 | 2.2055 | 0.9149 | 0.1781 |
| D19 | 0.8464 | 0.5645 | 0.9242 |

| Numerical Example 2 ||||
|---|---|---|---|
| $f = 1.0-5.563$ FNo = 1:1.45-1.95 $2\omega = 49.12°-9.393°$ ||||
| R1 = 9.777 | D1 = 0.1505 | N1 = 1.80518 | $\nu 1$ = 25.4 |
| R2 = 3.521 | D2 = 0.6129 | N2 = 1.51633 | $\nu 2$ = 64.1 |

-continued

Numerical Example 2
f = 1.0–5.563  FNo = 1:1.45–1.95  2ω = 49.12°–9.393°

| | | | |
|---|---|---|---|
| R3 = −6.819 | D3 = 0.0161 | | |
| R4 = 2.718 | D4 = 0.3763 | N3 = 1.65844 | ν3 = 50.9 |
| R5 = 8.507 | D5 = variable | | |
| R6 = −18.368 | D6 = 0.0860 | N4 = 1.83400 | ν4 = 37.2 |
| R7 = 1.176 | D7 = 0.3011 | | |
| R8 = −1.536 | D8 = 0.0860 | N5 = 1.60311 | ν5 = 60.7 |
| R9 = 1.536 | D9 = 0.2796 | N6 = 1.84666 | ν6 = 23.9 |
| R10 = −11.910 | D10 = variable | | |
| R11 = 4.133 | D11 = 0.2151 | N7 = 1.72342 | ν7 = 38.0 |
| R12 = 119.866 | D12 = 0.1075 | | |
| R13 = Stop | D13 = 0.2151 | | |
| R14 = 8.430 | D14 = 0.3871 | N8 = 1.72000 | ν8 = 50.2 |
| R15 = −2.127 | D15 = 0.2492 | | |
| R16 = −1.501 | D16 = 0.1075 | N9 = 1.84666 | ν9 = 23.9 |
| R17 = −6.310 | D17 = 0.0161 | | |
| R18 = 1.521 | D18 = 0.2473 | N10 = 1.65844 | ν10 = 50.9 |
| R19 = 1.896 | D19 = variable | | |
| R20 = 3.908 | D20 = 0.0860 | N11 = 1.84666 | ν11 = 23.9 |
| R21 = 1.717 | D21 = 0.1559 | | |
| R22 = 13.508 | D22 = 0.3011 | N12 = 1.51633 | ν12 = 64.1 |
| R23 = −2.828 | D23 = 0.0161 | | |
| R24 = 1.998 | D24 = 0.4409 | N13 = 1.69680 | ν13 = 55.5 |
| R25 = −5.565 | D25 = 0.5376 | | |
| R26 = ∞ | D26 = 0.6452 | N14 = 1.51633 | ν14 = 64.1 |
| R27 = ∞ | | | |

| | F = 1.0 | F = 2.484 | F = 5.563 |
|---|---|---|---|
| D5 | 0.1617 | 1.4520 | 2.1853 |
| D10 | 2.1844 | 0.8941 | 0.1608 |
| D19 | 1.1459 | 0.8664 | 1.2197 |

Numerical Example 3
f = 1.0–5.583  FNo = 1:1.45–1.95  2ω = 49.13°–9.360°

| | | | |
|---|---|---|---|
| R1 = 9.404 | D1 = 0.1506 | N1 = 1.80518 | ν1 = 25.4 |
| R2 = 3.484 | D2 = 0.6131 | N2 = 1.51633 | ν2 = 64.1 |
| R3 = −8.340 | D3 = 0.0161 | | |
| R4 = 2.766 | D4 = 0.3980 | N3 = 1.65844 | ν3 = 50.9 |
| R5 = 10.898 | D5 = variable | | |
| R6 = −27.741 | D6 = 0.0860 | N4 = 1.83400 | ν4 = 37.2 |
| R7 = 1.096 | D7 = 0.3046 | | |
| R8 = −1.523 | D8 = 0.0860 | N5 = 1.51633 | ν5 = 64.1 |
| R9 = 1.523 | D9 = 0.2796 | N6 = 1.84666 | ν6 = 23.9 |
| R10 = −28.748 | D10 = variable | | |
| R11 = 3.494 | D11 = 0.2366 | N7 = 1.62004 | ν7 = 36.3 |
| R12 = 12.424 | D12 = 0.1613 | | |
| R13 = Stop | D13 = 0.2151 | | |
| R14 = 4.301 | D14 = 0.4302 | N8 = 1.61484 | ν8 = 51.2 |
| R15 = −2.172 | D15 = 0.3110 | | |
| R16 = −1.470 | D16 = 0.1076 | N9 = 1.80518 | ν9 = 25.4 |
| R17 = −5.630 | D17 = 0.0161 | | |
| R18 = 1.451 | D18 = 0.3227 | N10 = 1.60311 | ν10 = 60.7 |
| R19 = 1.709 | D19 = variable | | |
| R20 = 3.293 | D20 = 0.0860 | N11 = 1.84666 | ν11 = 23.9 |
| R21 = 1.726 | D21 = 0.1300 | | |
| R22 = 4.183 | D22 = 0.3442 | N12 = 1.49831 | ν12 = 65.0 |
| R23 = −2.428 | D23 = 0.0161 | | |
| R24 = 1.676 | D24 = 0.3872 | N13 = 1.60311 | ν13 = 60.7 |
| R25 = −63.708 | D25 = 0.5378 | | |
| R26 = ∞ | D26 = 0.6453 | N14 = 1.51633 | ν14 = 64.1 |
| R27 = ∞ | | | |

| | F = 1.0 | F = 2.489 | F = 5.583 |
|---|---|---|---|
| D5 | 0.1715 | 1.4622 | 2.1882 |
| D10 | 2.2136 | 0.9230 | 0.1970 |
| D19 | 0.9631 | 0.7564 | 1.1658 |

TABLE 1

| Conditional Expressions | Numerical Examples | | |
|---|---|---|---|
| | 1 | 2 | 3 |
| (1) $|f2/fw|$ | 1.076 | 1.075 | 1.129 |
| (2) $|\beta 2T/\sqrt{z}|$ | 1.085 | 1.079 | 1.268 |

TABLE 1-continued

| Conditional Expressions | Numerical Examples | | |
|---|---|---|---|
| | 1 | 2 | 3 |
| (3) f4/fw | 2.105 | 2.150 | 2.038 |
| (4) f3/fw | 3.114 | 3.169 | 3.350 |
| (5) f3 − 1/f3 | 1.969 | 1.866 | 2.317 |
| (6) $|R2 − 1/f2|$ | 14.84 | 17.08 | 24.57 |
| (7) $|R3 − 5/f3|$ | 0.462 | 0.474 | 0.439 |
| (8) $|R4 − 2/f4|$ | 0.814 | 0.799 | 0.849 |
| (9) νP − νN | 41.55 | 35.9 | 38.95 |

What is claimed is:

1. A zoom lens, when counted from the object side, comprising:

a first lens group having a positive refractive power;

a second lens group having a negative refractive power;

a third lens group having a positive refractive power; and a fourth lens group having a positive refractive power, wherein said third lens group includes a front lens unit having a positive refractive power, an aperture stop and a rear lens unit, whereby variation of magnification is performed by moving said second lens group and said fourth lens group, and focusing is performed by moving said fourth lens group, said zoom lens satisfying the following conditional expressions, wherein focal lengths of said second, third, fourth lens groups and said front lens unit respectively are f2, f3, f4, and f3-1, the focal length of the entire lens system at the wide-angle end is fν, the zoom ratio is z, and the imaging magnification at a telephoto end of said second lens group is β2T:

$$0.9 < |f2/f\omega| < 1.3$$

$$0.9 < |\beta 2T/\sqrt{z}| < 1.4$$

$$1.8 < f4/f\omega < 2.4$$

$$2.8 < f3/f\omega < 3.7$$

$$1.6 < f3 − 1/f3 < 2.6$$

2. A zoom lens according to claim 1, wherein said first and third lens groups are arranged to be always stationary.

3. A zoom lens according to claim 1, wherein said first lens unit is a single lens, said rear lens unit includes successively a lens whose both sides are convex, a negative lens of a meniscus type with a convex side that confronts an image plane and a lens having a positive refractive power, and said fourth lens group includes a first negative lens of a meniscus type with a convex surface that confronts an object, a second lens whose both lens surfaces are convex and a third lens whose both lens surfaces are convex, said zoom lens satisfying the following conditional relationship, wherein the curvature radius of the j-th lens surface in the i-th lens group is Ri, j, and the Abbe numbers of materials of the positive lens and the negative lens in said fourth lens group are νP and νN, respectively:

$$1.2 < |R2,1/f2| < 27 \ldots \quad (6)$$

$$0.4 < |R3,5/f3| < 0.52 \ldots \quad (7)$$

$$0.71 < |R4,2/f4| < 0.93 \ldots \quad (8)$$

$$32 < \nu P - \nu N, \ldots \quad (9)$$

4. A zoom lens, when counted from the object side, comprising:
   a first lens group having a positive refractive power;
   a second lens group having a negative refractive power;
   a third lens group having a positive refractive power; and
   a fourth lens group having a positive refractive power;
   said third lens group including:
   a first positive lens;
   an aperture stop;
   a second lens whose both lens surfaces are convex;
   a third negative lens of a meniscus type whose convex surface confronts the image plane; and
   a fourth positive lens, and
   said fourth lens group including:
   a first negative lens of a meniscus type whose convex surface confronts the object side;
   a second lens whose both lens surfaces are convex; and
   a third lens whose both lens surfaces are convex wherein
   variation of magnification is performed by moving said second lens group, image plane change due to said variation is corrected by moving said fourth lens group, and focusing is performed by moving said fourth lens group, said zoom lens satisfying the following conditional expressions, wherein the focal length of the i-th lens group is fi, the curvature radius of the j-th lens surface in the i-th lens group is Ri,j, and the Abbe numbers of the positive lens and the negative lens in said fourth lens group are $\nu P$ and $\nu N$, respectively:

$$1.2 < |R2,1/f2| < 27 \ldots \quad (6)$$

$$0.4 < |R3,5/f3| < 0.52 \ldots \quad (7)$$

$$0.71 < |R4,2/f4| < 0.93 \ldots \quad (8)$$

$$32 < \nu P - \nu N, \ldots \quad (9)$$

5. A zoom lens according to claim 4, wherein said first and third lens groups are arranged to be always stationary.

6. A zoom lens comprising, when counted from an object side:
   a first lens group having a positive refractive power;
   a second lens group having a negative refractive power;
   a third lens group having a positive refractive power; and
   a fourth lens group having a positive refractive power, wherein said second and fourth lens groups are moved so as to perform variation of magnification, and said fourth lens group is moved so as to perform focusing, said zoom lens satisfying the following conditional expressions, wherein the focal length of said fourth lens group is f4, the focal length of the entire lens system at a wide-angle end is f$\omega$, the imaging magnification of said second lens group at the telephoto end is $\beta$2T, the magnification varying ratio is z; the focal length of said second lens group is f2; and the focal length of said third lens groups if 3:

$$0.9 < |\beta 2T/\sqrt{z}| < 1.4$$

$$1.8 < f_4/f\omega < 2.4$$

$$0.9 < |f_2/f\omega| < 1.3$$

$$2.8 < f_3/f\omega \; 3.7$$

7. A zoom lens according to claim 6, wherein said first and third lens groups are arranged to be always stationary.

8. A zoom lens according to claim 6, wherein said third lens group has an aperture stop.

9. A zoom lens according to claim 8, satisfying the following conditional expression provided that the focal length of the lens in said third lens group positioned more adjacent to the object side than said aperture stop is f3-1, and the focal length of said third lens group is f3:

$$1.6 < f3\text{-}3/f3 < 2.6.$$

* * * * *

UNITED STATES PATENT AND TRADEMARK OFFICE
CERTIFICATE OF CORRECTION

PATENT NO. : 5,009,492

DATED : April 23, 1991

INVENTOR(S) : Hiroyuki Hamano

It is certified that error appears in the above-identified patent and that said Letters Patent is hereby corrected as shown below:

IN THE ABSTRACT

Line 3, "positive" should read --negative--.

COLUMN 1

Line 27, "group" should read --groups--.

COLUMN 4

Line 20, "contrary, the" should read --contrary, if the--.

COLUMN 5

Line 18 and 19 "a fourth lens having a positive refractive power" should be a new paragraph.
Line 43, "Then," should read --Now--.
Line 45 and 46 'The conditional expression (6) relates to the curva-" should be a new paragraph.
Line 53, "contrary, the" should read --contrary, if the--.
Line 56, "conditional expression (9)" should read --conditional expression (7)--.

UNITED STATES PATENT AND TRADEMARK OFFICE
CERTIFICATE OF CORRECTION

PATENT NO. : 5,009,492         Page 2 of 3
DATED      : April 23, 1991
INVENTOR(S): Hiroyuki Hamano It is certified that error appears in the above-identified patent and that said Letters Patent is hereby corrected as shown below:

COLUMN 6

Line 8, "contrary, negative" should read --contrary, if negative--.
Line 20, "Then," should read --Now,--.
Line 25, "vi" should read --$\upsilon$i--.

IN THE CLAIMS

COLUMN 8

Line 33, "f$\upsilon$," should read --f$\omega$,-- .
Line 44, "1.6 < f3 - 1/f3 < 2.6" should read --1.6 < f3-1/ f3 < 2.6--.
Line 64, delete "..." and  "(6)".
Line 66, delete "..." and  "(7)".
Line 68, delete "..." and  "(8)".

COLUMN 9

Line 2, delete ",..." and  "(9)" and insert --.-- (period).
Line 26, "convex" should read --convex,--.
Line 40, delete "..." and  "(6)".
Line 42, delete "..." and  "(7)".
Line 44, delete "..." and  "(8)".
Line 46, delete ",..." and  "(9)" and insert --.-- (period).

UNITED STATES PATENT AND TRADEMARK OFFICE
CERTIFICATE OF CORRECTION

PATENT NO. : 5,009,492  
DATED : April 23, 1991  
INVENTOR(S) : Hiroyuki Hamano

Page 3 of 3

It is certified that error appears in the above-identified patent and that said Letters Patent is hereby corrected as shown below:

COLUMN 10

Line 23, "third lens groups if 3:" should read
--third lens group is f3"--.

Line 32, "2.8 < f3/fω 3.7" should read --2.8 < $f_3$/fω < 3.7--.

Line 45, "1.6 < f3-3/f3 < 2.6" should read
--1.6 < f3-1/f3 < 2.6--.

Signed and Sealed this

Twenty-ninth Day of December, 1992

*Attest:*

DOUGLAS B. COMER

*Attesting Officer*     *Acting Commissioner of Patents and Trademarks*